UNITED STATES PATENT OFFICE 2,465,293

SYNTHESIS OF 4-HYDROXYCOUMARINS

Mark A. Stahmann and Karl Paul Link, Madison, Wis., assignors to Wisconsin Alumni Research Foundation, Madison, Wis., a corporation of Wisconsin No Drawing. Application August 29, 1942, Serial No. 456,710

6 Claims. (Cl. 260—344.6)

Our invention relates to the synthesis of 4-hydroxycoumarin and 3-hydrocarbon-substituted-4-hydroxycoumarins. We shall call these collectively 4-hydroxycoumarins. We have discovered that they have anti-coagulant properties.

It is the object of our invention to synthesize these 4-hydroxycoumarins by a process which is free from many of the difficulties of previous processes (which have been used to produce only a few 4-hydroxycoumarins), is more nearly free from troublesome side reactions, gives increased yields, is more convenient from a manipulative standpoint, and is suitable for large-scale production; and to purify them simply and effectively.

These 4-hydroxycoumarins are desmotropic, and have both the enol structure indicated by that name and the keto structure indicated by the name 2,4-diketochromans. They are represented by the following general formula:

(1)

Enol form          Keto form in which R represents a member of the class consisting of hydrogen and monovalent hydrocarbon groups, whether aliphatic or aromatic. If R is hydrogen, the compound is 4-hydroxycoumarin. For simplicity, we shall in general show only the enol forms, and shall use only the name 4-hydroxycoumarins; and in formulas shall omit the hydrogen atoms on the benzene ring.

A few 4-hydroxycoumarins, including 4-hydroxycoumarin itself, have previously been prepared. This has been done by processes set forth in the following:

German Patent No. 102,096
German Patent No. 102,097
German Patent No. 102,746
Anschutz, Berichte, vol. 36, p. 465 (1903).
Anschutz, Annalen der Chemie, vol. 367, p. 196 (1909).
Pauly & Lockemann, Berichte, vol. 48, p. 28 (1915).
Sonn, Berichte, vol. 50, p. 1292 (1917)
Bauer and Schoder, Arch. Pharm., vol. 269, p. 53 (1929).
Heilbron and Hill, Jour. Chem. Soc., vol. II, p. 1705 (1927).

Our process may be considered an improvement on the Pauly & Lockemann process, for it is based on the same fundamental reaction. This reaction is—

(2)

An acylsalicylic acid ester    A salt of a 4-hydroxycoumarin    An alcohol in which R has the same significance as before, R' is a monovalent hydrocarbon group, most conveniently methyl or ethyl, (which is eliminated in the reaction to form the corresponding alcohol,) and M is an alkali metal, desirably sodium. On adding sufficient acid, such as hydrochloric or sulfuric acid, the salt of the 4-hydroxycoumarin is converted into the 4-hydroxycoumarin itself.

The following two species (indicated as overall reactions in which the sodium has been disposed of by the subsequent acidification) are the only two which Pauly and Lockemann give:

(3)

Acetylsalicylic acid methyl ester    4-hydroxycoumarin    Methyl alcohol (4)

Phenylacetylsalicylic acid methyl ester 3-phenyl-4-hydroxy coumarin    Methyl alcohol Pauly and Lockemann carried out their processes without a solvent, by adding metallic sodium to molten acetylsalicylic acid methyl ester or to molten phenylacetylsalicylic acid methyl ester. They point out that in doing this the reaction temperature must be kept within the definite and narrow range of 160–175° C.; for reaction does not occur appreciably below about 160° C., and under their conditions overheating (leading ultimately to carbonization) occurs if the temperature rises above about 175° C. Since the reaction evolves much heat, this means that the sodium must be added very slowly, and in very small pieces, and involves a careful and difficult temperature control—a temperature control which is especially difficult, if not impossible at points, because of the local superheating produced at and near the metallic sodium, even if this is added in small particles. The hot sodium particles frequently ignite the vapors produced.

Moreover, as the Pauly and Lockemann reaction progresses, the reaction mixture becomes thick and viscous, (which makes stirring and hence intimate mixing very difficult), and finally solidifies in a mass—in the reaction vessel itself unless extreme care is taken. Because of these things, the Pauly and Lockemann reaction must be carried out in very small batches, of about 100 grams as a maximum; even with those small batches stirring and temperature control are very difficult, and with larger batches effective stirring and temperature control are practically impossible.

In addition, the Pauly and Lockemann reaction between metallic sodium and the initial molten ester, with no solvent, is accompanied by many side reactions; and their method of recovery, which requires many recrystallizations and necessitates the handling of large quantities of hot solutions and the consequent labor in manipulation and loss in yield, does not readily and effectively separate the desired 4-hydroxycoumarin from the products of these side reactions. These things make very difficult the obtaining of a 4-hydroxycoumarin of reasonable purity; and make substantially impossible the obtaining of effective yields. While Pauly and Lockemann reported that their yield was 55%, we have been unable in many repeatings of their process to get a yield of over 12–14% of any 4-hydroxycoumarin of reasonable purity—although we have obtained much larger amounts of various unwanted acidic by-products, which Pauly and Lockemann perhaps included in their 55%.

We have discovered the surprising fact that we can largely or wholly avoid these difficulties, and can about double the yield over the best we can obtain by the Pauly and Lockemann procedure, by carrying out the reaction in an inert solvent, most effectively at a higher temperature than is possible when no solvent is used.

By using an inert solvent, we get many advantages:

1. The temperature may be accurately and easily controlled.
2. The stirring may be easily and effectively done.
3. The danger of solidification of the reaction mixture is avoided.
4. The 4-hydroxycoumarins are obtained (as sodium salts) in a form readily collectible by filtering or decanting and better adapted for further operations—such (a) as purification, and (b) as further reaction if the 4-hydroxycoumarin is to be used as an intermediate. In some cases, notably 4-hydroxycoumarin itself, this form is a fine powder, instead of the solid mass which Pauly and Lockemann obtained.
5. The permissible temperature range is broader, and extends higher, with the optimum temperature considerably higher than the 175° upper limit of Pauly and Lockemann. In the 160–175° range the reaction product is nearly half salicylic acid; but by raising the temperature, as our process permits but the Pauly and Lockemann process does not permit, the amount of salicylic acid in the reaction product is decreased, to substantially zero at about 220°–230° C., and the yield of the 4-hydroxycoumarin is increased. With our process the maximum yield of 4-hydroxycoumarin is with the temperature between 220° and 280° C.
6. The 4-hydroxycoumarins obtained are purer, and purification is easier, especially when the reaction temperature is in the optimum range of 220°–280° C.; and in consequence fewer recrystallizations are necessary.
7. The order of adding reactants is immaterial.
8. The ratio of reactants is not critical; for the sodium may be present in considerable excess, and may be as low as 60% of theory, without materially affecting the reaction or the yield.
9. The alkali metal which serves as the condensing agent in the reaction of Equation 2 may be present either in metallic form, as we prefer, or in the form of an alcholate or amide, such as sodium methylate, potassium ethylate, lithium isopropylate, or sodium amide.
10. It is unnecessary to use initial reactants of high purity.

Many different inert solvents may be used. In fact, any solvent may be used which has at least a portion in liquid phase (even if it is boiling) at the reaction temperature and with which the initial acyl salicyclic acid ester and the alkali metal and the final 4-hydroxycoumarin do not react.

Among the inert solvents which can be used are those high-boiling hydrocarbons and petroleum fractions of which at least part remains in liquid phase at the temperature used in the reaction. These include paraffins and other hydrocarbons, kerosene, fuel oils, and lubricating oils. A high-boiling ether not subject to cleavage in the presence of sodium at high temperatures can also be used as the inert solvent, one such ether being the dimethyl ether of tetraethyleneglycol, known as dimethoxytetraglycol.

The solvent which we prefer is a high-boiling paraffin fraction liquid at about 150° C. or lower and boiling at not less than 260° C. One such high-boiling paraffin fraction, which we have found very suitable, is sold by the Standard Oil Company of Indiana under the trade-mark "Stanolind."

We have also discovered that we can simply and effectively purify 4-hydroxycoumarins by forming a water solution of an alkali-metal salt of the impure 4-hydroxycoumarin, adding acid to lower the pH to a value low enough to produce a precipitate containing impurities but high enough to avoid material precipitation of the 4-hydroxycoumarin, removing the precipitate so produced, and then adding more acid to the remaining aqueous phase to lower the pH to a value low enough to precipitate the 4-hydroxycoumarin in purified form. These pH values vary with different 4-hydroxycoumarins. The first is slightly above the pK value for the particular 4-hydroxycoumarin, say by about one pH unit; and the second is definitely below that pK value, and conveniently well below it by the use of an excess of acid. They may be determined by plotting the pH values against increments of acid as a sample of the aqueous solution of the alkali-metal salt is progressively acidulated, and keeping the first pH value somewhat above and the second well below the plateau which the curve shows.

The following are examples of our process:

*Example 1.—4-hydroxycoumarin*

A. *Preparing acetylmethylsalicylate.*—To prepare 4-hydroxycoumarin we use acetylmethylsalicylate (acetylsalicylic acid methyl ester) as a reactant. If this is not available, it may be prepared as follows: To a mixture of 2 kg. of methylsalicylate and 2 kg. of acetic anhydride add 15 ml. of concentrated sulfuric acid and mix thoroughly. Then allow the mixture to stand at about room temperature about 40 minutes, and then add the mixture slowly to about 15 liters of cold water, which desirably contains a liberal amount of seed crystals (if available) from a previous run and should be well stirred during the addition and for some time afterwards, say about half an hour. Allow the resultant mixture to stand about six hours to decompose the excess acetic anhydride, and then recover the solid material by filtration and wash it with water. It is the desired acetylmethylsalicylate; and has a melting point of about 47–49° C. without recrystallization. The yield is about 2350 grams (92% of theory).

B. *Preparing the 4-hydroxycoumarin.* — Put about 1200 ml. of a high-boiling petroleum fraction ("Stanolind") and 96 grams (4.1 moles) of sodium in a suitable flask, conveniently equipped with a stiff stirrer (such as a Hersberg stirrer), a thermometer, a short fractionation column with condenser and receiver, and an introduction port. Heat this to about 240°–250° C., conveniently on a metal bath; and then, with the stirrer operating, slowly add 800 grams (4.1 moles) of dry acetylmethylsalicylate, desirably in small portions, over a period of about thirty minutes. If desired, the order of addition may be reversed, with the acetylmethylsalicylate added first and the sodium later; but we find it more convenient to add the sodium first.

After the addition of reactants is completed, maintain the whole at about 240°–250° C. for about 90 minutes. The temperature named (240°–250° C.) may be varied considerably; from as low as 180° C., or even 160° C. although that is not desirable, to as high as 320° C.; but optimum results are obtained between 220° and 280° C., and we prefer to keep within the lower part of that optimum range but definitely above the 220° C. which constitutes its lower limit. By keeping above 220° C., we avoid practically completely the presence of salicylic acid in the reaction product.

During the first stages of the reaction, about 250–300 g. of a distillate is given off; but that is not the desired 4-hydroxycoumarin, and may be discarded so far as this reaction is concerned. (This distillate contains salicylic acid, phenol, acetic acid, methyl acetate, and probably other things.) As the reaction then continues, a brown granular product forms. The reaction is complete, usually in about 90 minutes after the addition of acetylmethylsalicylate, when there appears to be no metallic sodium in the reaction mixture; which may be tested by removing a small sample of such mixture, adding ethanol to it, and getting no evolution of hydrogen. When the reaction is thus determined to be complete the brown product is recovered by filtration, desirably while the solution is hot. The product so recovered, after being cooled, is washed with a petroleum fraction, desirably a low-boiling one; and any residual washing liquid is removed by drying. This brown granular product is largely the crude sodium salt of 4-hydroxycoumarin; formed by the following reaction:

(5)

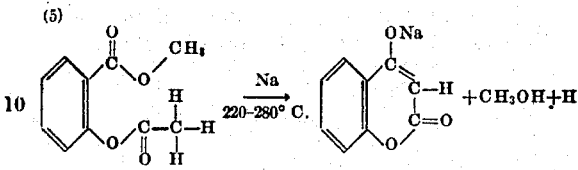

Add this brown granular product slowly to about 4 liters of water, desirably maintained at about 60°–70° C. During this addition the water should be stirred vigorously, and an air stream is desirably blown over the surface of the water to remove hydrogen and to quench any small sodium fires that may form if any particles of unreacted sodium remain. When all the brown product has been well stirred into and for the most part dissolved in the water, which usually takes about 30 minutes, add an acid, conveniently concentrated hydrochloric or sulfuric acid, in sufficient amount to reduce the pH to about 5.5 to 6.0; and maintain the temperature at about 50° C. During this acidification a precipitate (of the impurities) forms; and at about pH 5.5–6.0 this precipitate flocculates into a light, gummy, sticky mass which rises to the surface. Remove this, as far as possible, by skimming, and discard it. Shake out the remaining solution once with a suitable impurity-removing solvent, most conveniently an equal volume of ethyl ether but permissibly other oil-solvents such as chloroform or light petroleum fractions, to remove any residuum of this gummy precipitate.

Now separate the aqueous phase, and further acidify it to about pH 1.5, conveniently with hydrochloric or sulfuric acid. During and following this latter acidification the 4-hydroxycoumarin separates out, as a powdery precipitate. To ensure maximum separation now allow the whole to stand for several hours, and then collect the precipitated crude 4-hydroxycoumarin, as by filtration.

While this crude 4-hydroxycoumarin is fairly pure, and sufficiently pure for use, increased purity may be obtained by one or two recrystallizations from boiling water. Residual traces of oily impurities, as those from the petroleum fractions used, may be removed by filtering the hot aqueous solution of crude 4-hydroxycoumarin through a heated fluted funnel during the recrystallization.

Additional 4-hydroxycoumarin may be recovered, in the form of 3,3'-methylenebis(4-hydroxycoumarin), by precipitation from the various mother liquors by the addition of formaldehyde.

The 4-hydroxycoumarin produced by our process, after one recrystallization, usually has a melting point of about 200°–206° C. By repeated recrystallizations the melting point may be increased to 213°–217° C.

The yield of 4-hydroxycoumarin direct is about 145 g., or 22% of theory; and the yield of 3,3'-methylenebis(4-hydroxycoumarin) is about 4–5 g., which when calculated to 4-hydroxycoumarin is another 0.4%, to make the total yield about 22.4% of theory.

*Example 2.—4-hydroxycoumarin*

Example 1 is repeated, except that instead of using acetylmethylsalicylate (the methyl ester of acetylsalicylic acid) we use acetylethylsalicylate or acetylpropylsalicylate or acetylphenylsalicylate (respectively the ethyl, propyl, and phenyl esters of acetylsalicylic acid) or other convenient alkyl or aryl ester of acetyl salicylic acid. We obtain 4-hydroxycoumarin in the same way as in Example 1; but the alcohol eliminated in the reaction is ethyl or propyl or phenyl or other alcohol, corresponding to the esterifying group R' of the initial acetylsalicylic acid ester.

However, we have found no advantage in the use of the higher esters instead of the methyl ester of acetylsalicylic acid.

*Example 3.—4-hydroxycoumarin*

Examples 1 and 2 are repeated, except that instead of using one mole of sodium per mole of acetylmethylsalicylate (or other ester) we vary the molecular proportions, with the sodium ranging from 0.6 mole to 2.0 moles per mole of the ester of acetylsalicylic acid. The ratio we prefer is about 0.8 mole of sodium per mole of the ester.

*Example 4.—4 hydroxycoumarin*

Examples 1, 2, and 3 are repeated, except that instead of using sodium as the alkali metal we use potassium or lithium. When lithium is used we find that the optimum reaction temperature is somewhat higher, and when potassium is used we find that the optimum reaction temperature is somewhat lower, than when sodium is used; it is of the order of 180°–210° C. for potassium. But we prefer sodium to either potassium or lithium.

*Example 5.—4-hydroxycoumarin*

Examples 1, 2, 3, and 4 are repeated, except that instead of using metallic sodium or potassium or lithium, we use suitable alkali-metal compounds as condensing agents, such as sodium methylate, sodium ethylate, sodium isopropylate, sodium amylate, or sodamide (sodium amide), or the corresponding potassium or lithium compounds. But we prefer to use the alkali metals in metallic form.

*Example 6.—3-methyl-4-hydroxycoumarin*

A. *Preparing propionylmethylsalicylate.* — To prepare 3-methyl-4-hydroxycoumarin we use propionylmethylsalicylate (propionylsalicylic acid methyl ester) as a reactant. This may be prepared as follows: Mix thoroughly 176 g. of methyl salicylate, 225 g. of propionic anhydride, and 5 ml. of concentrated sulfuric acid. Let the mixture stand for about 40 minutes, and then pour it into about 6 liters of water. An oil separates. Wash that oil with sodium-carbonate solution; and then distill it, and collect the fraction which boils at 140°–144° C. at 15 mm. pressure. This is the desired propionylmethylsalicylate. The yield is about 218 g. (90%). If desired, it may be purified by fractional distillation; after which it boils at 141.5°–142° C. at 9 mm. pressure.

$D^{25}$ 1.1579; $N_D^{25}$ 1.5039

Analysis: Calculated for $C_{11}H_{12}O_4$: C, 63.46; H, 5.79. Found: C, 63.47; H, 6.00.

B. *Preparing 3-methyl-4-hydroxycoumarin.*— To 150 ml. of a suitable mineral oil or other inert solvent add about 8.5 g. of sodium, heat to about 250° C., and then slowly add 75 g. of propionylmethylsalicylate while stirring vigorously. Maintain the temperature for about 30 minutes, under reflux. Filter off the mineral oil, which leaves behind a powdery residue. Wash that powdery residue with a low-boiling petroleum fraction, and then stir it into and so far as possible dissolve it in about 800 ml. of water. Then acidify the solution, as with hydrochloric or sulfuric acid, to about pH 6.5; whereupon a gummy precipitate forms, which is removed by extraction with ethyl ether or other suitable solvent, such as a light petroleum fraction or chloroform. After that gummy precipitate has been thus removed, acidify the remaining aqueous layer to about pH 1.5, as with more hydrochloric or sulfuric acid. The desired 3-methyl-4-hydroxycoumarin crystallizes out during this last acidification. The yield is about 18 g. (28%). After being recrystallized from hot alcohol to which water is added to the point of turbidity, its melting point is about 227°–228° C. This is very close to the melting point reported by Heilbron and Hill (Jour. Chem. Soc. for 1927, page 1705) for the 3-methyl-4-hydroxycoumarin prepared by them from the acid chloride of acetylsalicylic acid and the diethylester of sodio-methyl-malonic acid—a method wholly different from ours.

Our overall reaction for producing 3-methyl-4-hydroxycoumarin is as follows:

(6)
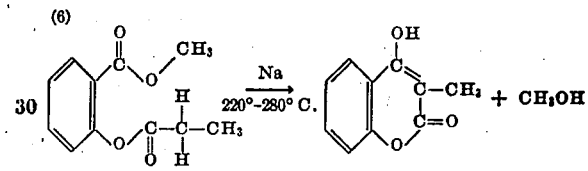

*Example 7.—3-ethyl-4-hydroxycoumarin*

A. *Preparing n-butyrylmethylsalicylate.*—To prepare 3-ethyl-4-hydroxycoumarin we use n-butyrylmethylsalicylate (n-butyrylsalicylic acid methyl ester) as a reactant. This is prepared as follows: Reflux 106 g. of n-butyryl chloride and 144 g. of methyl salicylate for about one hour. Then distill the mixture, and collect the fraction boiling at 150°–152° C. at 10 mm. pressure. This is the desired n-butyrylmethyl-salicylate. The yield is about 170 g. (81%). If desired it may be purified by fractional distillation, after which it boils at 155°–156° C. at 12 mm. pressure.

$D^{25}$ 1.1279, $N_D^{25}$ 1.5011

Analysis: Calculated for $C_{12}H_{14}O_4$: C, 64.86; H, 6.30. Found: C, 64.85; H, 6.42.

B. *Preparing the 3-ethyl-4-hydroxycoumarin.*—To about 105 ml. of a suitable mineral oil (or other inert solvent) add about 5.2 g. of sodium, heat to about 250° C., and then slowly add about 50 g. of n-butyrylmethylsalicylate, while stirring vigorously. Maintain the temperature, under reflux, for about 30 minutes after the addition is complete. Decant off the mineral oil from the residue, which is gummy in character; and wash that residue with a low-boiling petroleum fraction, and then stir it into and so far as possible dissolve it in about 600 ml. of water. Then acidify the solution to about pH 6.0, as with hydrochloric acid; which produces a gummy precipitate. Extract that gummy precipitate with ethyl ether, chloroform, or light petroleum fraction. Separate the remaining aqueous layer, and acidify it to about pH 1.5. The desired 3-ethyl-4-hydroxycoumarin crystallizes out during this latter acidification. The yield is about 12.0 g. (28%). When recrystallized from ethyl alcohol and water, the melting point is about 155°–156° C.

Analysis: Calculated for $C_{11}H_{10}O_3$: C, 69.47; H, 5.26. Found: C, 69.59; H, 5.41.

Our overall reaction is as follows:

(7)

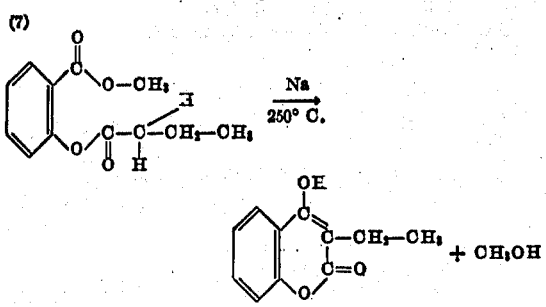

Example 8.—3-n-propyl-4-hydroxycoumarin

A. *Preparing n-valerylmethylsalicylate.* — To prepare 3-n-propyl-4-hydroxycoumarin we use n-valerylmethylsalicylate (n-valerylsalicylic acid methyl ester) as a reactant. It may be prepared as follows: Reflux 50 g. of valeric acid and 92 g. of thionyl chloride for about 4 hours, then add 74.5 g. of methylsalicylate, then reflux for about 3 hours longer, and then fractionally distill. Collect the fraction boiling between 155° and 160° C. at 8 mm. pressure. This is the desired n-valerylmethylsalicylate. The yield is about 75 g. (65%). If desired it may be purified by fractional distillation, after which it boils at 158.5°–159° C. at 8 mm. pressure.

$D^{25}$ 1.1014; $N_D^{25}$ 1.4964

Analysis: Calculated for $C_{13}H_{16}O_4$: C, 66.10; H, 6.78. Found: C, 66.31; H, 6.90.

B. *Preparing 3-n-propyl-4-hydroxycoumarin.* —Heat about 4.9 g. of sodium in 100 ml. of mineral oil ("Stanolind") to about 250° C., and slowly add 50 g. of n-valerylmethylsalicylate, while stirring vigorously. After the addition maintain the temperature at about 250° C., under reflux, for about 40 minutes. Then decant the mineral oil from the gummy residue which has formed, wash that gummy residue with a low-boiling petroleum fraction, and then stir it into and so far as possible dissolve it in about 600 ml. of water. Then acidify the solution to about pH 6, which causes a gummy precipitate to form; and remove that gummy precipitate, as by extracting with ether. Separate the aqueous layer, and acidify it to about pH 1.5. The desired 3-n-propyl-4-hydroxycoumarin crystallizes out during this last acidification. The yield is about 13.9 g. (32%). When the product is recrystallized from ethyl alcohol and water its melting point is 134–135° C.

Analysis: Calculated for $C_{12}H_{12}O_3$: C, 70.59; H, 5.88. Found: C, 70.44; H, 6.09.

Our overall reaction is as follows:

(8)

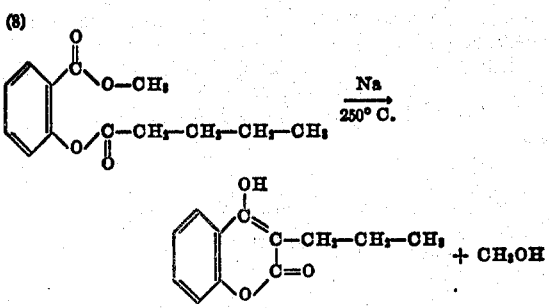

Example 9.—3-isopropyl-4-hydroxycoumarin

A. *Preparing isovalerylmethylsalicylate.* — To prepare 3-isopropyl-4-hydroxycoumarin, we use isovalerylmethylsalicylate (isovalerylsalicylic acid methyl ester) as a reactant. It may be prepared as follows: Reflux 100 g. of isovaleric acid and 185 g. of thionyl chloride for about 2 hours, then add 149 g. of methyl salicylate, then reflux further for about 2 hours, and then fractionally distill. Collect the fraction boiling between 145° and 154° C. at 8 mm. pressure. This is the desired isovalerylmethylsalicylate. The yield is about 166 g. (71%). If desired it may be purified by fractional distillation, after which it boils at 151–151.5° C. at 8 mm. pressure.

$D^{25}$ 1.0980; $N_D^{25}$ 1.4960

Analysis: Calculated for $C_{13}H_{16}O_4$: C, 66.10; H, 6.78. Found: C, 65.92; H, 7.01.

B. *Preparing 3-isopropyl-4-hydroxycoumarin.* —Heat 4.9 g. of sodium in 100 ml. of mineral oil to about 250° C., then slowly add 50 g. of isovalerylmethylsalicylate while vigorously stirring, and maintain the temperature of 250° C., under reflux, for about 40 minutes after the addition is complete. Decant the mineral oil from the gummy residue which has been formed; and then wash that gummy residue with a low-boiling petroleum fraction, and stir it into and so far as possible dissolve it in about 800 ml. of water. Acidify the solution thus formed to about pH 6.5, as with hydrochloric acid; which forms a gummy precipitate. Remove this gummy precipitate by extraction with ether. Then separate the aqueous phase, and acidify it to pH 1.5, as with hydrochloric acid. The desired 3-isopropyl-4-hydroxycoumarin crystallizes out during this last acidification. The yield is about 11.1 g. (25%). When recrystallized from ethyl alcohol and water, its melting point is 172–174° C.

Analysis: Calculated for $C_{12}H_{12}O_3$: C, 70.59; H, 5.88. Found: C, 71.15; H, 6.01.

Our overall reaction is as follows:

(9)

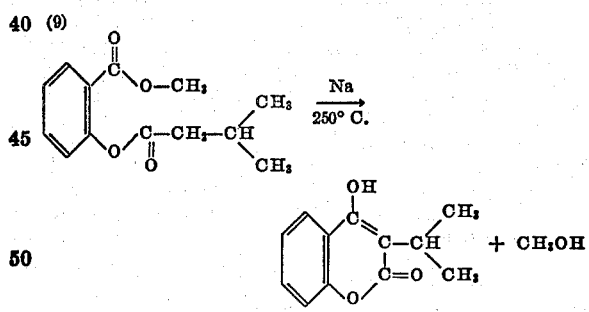

Example 10.—3-n-butyl-4-hydroxycoumarin

A. *Preparing n-capronylmethylsalicylate.*—To prepare 3-n-butyl-4-hydroxycoumarin we use capronylmethylsalicylate (capronylsalicylic acid methyl ester) as a reactant. It may be prepared as follows: Reflux 400 g. of caproic acid and 492 g. of thionyl chloride for about 10 hours, then add 678 g. of methylsalicylate and reflux for about 3 hours longer, and then fractionally distill. Collect the fraction boiling between 165–170° C. at 15 mm. pressure. This is the desired capronylmethylsalicylate. The yield is about 483 g. (56%). If desired it may be purified by fractional distillation, after which it boils at 173°–174° C., at 9 mm. pressure.

$D^{25}$ 1.0874; $N_D^{25}$ 1.4982

Analysis: Calculated for $C_{14}H_{18}O_4$: C, 67.20; H, 7.20. Found: C, 67.25; H, 7.74.

B. *Preparing the 3-n-butyl-4-hydroxycoumarin.*—Heat 9.2 g. of sodium in 200 ml. of mineral oil to about 250° C.; then add 75 g. of capronylmethylsalicylate while stirring, and maintain the temperature for about 30 minutes, under reflux, after such addition is completed. Decant the mineral oil from the gummy residue which has been formed. That gummy residue solidifies on cooling. Wash that residue with a low-boiling petroleum fraction, and then stir it into and so far as possible dissolve it in about 800 ml. of water. Reduce the pH of the solution thus formed to about pH 7.0, as with hydrochloric acid; whereupon an oil separates. Remove that oil by extraction with ether; and separate the aqueous layer, and acidify it to about pH 1.5. On this last acidification the desired 3-n-butyl-4-hydroxycoumarin crystallizes out. The yield is about 23.2 g. (26%). When it is recrystallized from ethyl alcohol and water, its melting point is about 158.5°–159.5° C.

Analysis: Calculated for $C_{13}H_{14}O_3$: C, 71.56; H, 6.42. Found: C, 71.81; H, 6.48.

Our overall reaction is as follows:

(10)

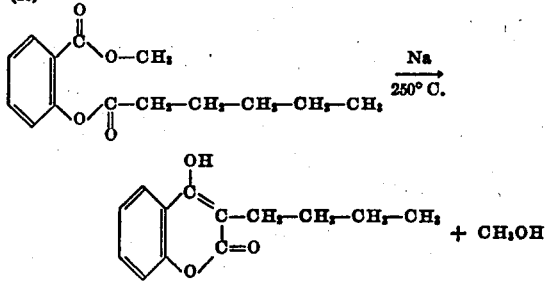

*Example 11.—3-n-amyl-4-hydroxycoumarin*

A. *Preparing n-heptoylmethylsalicylate.*—To prepare 3-n-amyl-4-hydroxycoumarin, we use n - heptoylmethylsalicylate (n - heptoylsalicylic acid methyl ester) as a reactant. It may be prepared as follows: Reflux 100 g. of heptoyl chloride and 103 g. of methylsalicylate for about 2 hours, and then fractionally distill. Collect the fraction boiling between 173°–179° C. at 7 mm. pressure. This is the desired n-heptoylmethylsalicylate. The yield is about 129 g. (73%). If desired it may be purified by fractional distillation, after which it boils at 181°–182° C. at 9 mm. pressure.

$D^{25}$ 1.0667; $N_D^{25}$ 1.4941

Analysis: Calculated for $C_{15}H_{20}O_4$: C, 68.18; H, 7.50. Found: C, 68.31; H, 7.86.

B. *Preparing 3-n-amyl-4-hydroxycoumarin.*—Heat 4.4 g. of sodium in 100 ml. of mineral oil to about 250° C., and add 50 g. of n-heptoylmethylsalicylate while stirring vigorously. Maintain the 250° temperature, under reflux, for about 40 or 45 minutes after the addition is complete. Decant the mineral oil to separate it from the gummy residue which has formed; and wash that gummy residue with a low-boiling petroleum fraction, and then stir it into and so far as possible dissolve it in about 800 ml. of water. Reduce the pH to about pH 7.5, as by adding hydrochloric acid; whereupon a gummy precipitate forms. Remove that gummy precipitate, as by extraction with ether; and then separate the aqueous phase, and acidify it to about pH 1.5, as with hydrochloric acid. The desired 3-n-amyl-4-hydroxycoumarin crystallizes out during this last acidification. The yield is about 13.4 g. (30%). When recrystallized from ethyl alcohol and water, its melting point is about 137–139° C.

Analysis: Calculated for $C_{14}H_{16}O_3$: C, 72.41; H, 6.70. Found: C, 72.22; H, 6.91.

Our overall reaction is as follows:

(11)

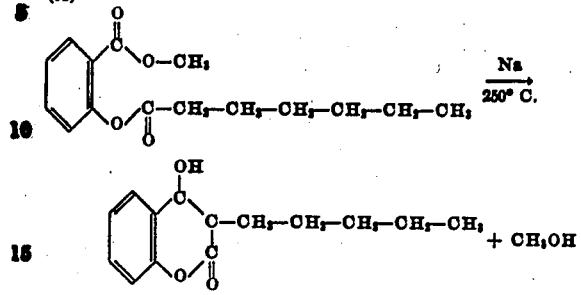

*Example 12.—3-hexadecyl-4-hydroxycoumarin*

A. *Preparing stearylmethylsalicylate.*—To prepare 3-hexadecyl-4-hydroxycoumarin we use stearylmethylsalicylate (stearylsalicylic acid methyl ester) as a reactant. It may be prepared as follows: Heat 100 g. of stearic acid and 74 g. of phosphorus pentachloride on a steam bath for about 30 minutes, continue the heating under vacuum for 30 minutes longer in a dry nitrogen stream at 140° C., and then, while the mixture is still hot, add 54 g. of methyl salicylate and heat the mixture on a steam bath until the evolution of hydrochloric acid gas ceases, which usually takes about 3 hours. This yields a dark liquid. Fractionally distill that dark liquid, and collect the fraction which boils at 226–230° C. at 0.05 mm. pressure. The clear distillate solidifies on cooling. It is the desired stearylmethylsalicylate, which melts at 41–43° C. The yield is about 70 g. (47%).

Analysis: Calculated for $C_{26}H_{42}O_4$: C, 74.83; H, 10.10. Found: C, 74.81; H, 10.10.

B. *Preparing 3-hexadecyl - 4 - hydroxycoumarin.*—Heat 2.2 g. of sodium in 100 ml. of mineral oil to about 225° C., and then add 40 g. of stearylmethylsalicylate while stirring vigorously. Maintain the temperature of about 225° C., under reflux, for about 40 or 45 minutes after the addition is complete. Then decant the mineral oil from the heavy syrup which has been formed; and wash that syrup with a low-boiling petroleum fraction, and then stir it into and so far as possible dissolve it in about 600 ml. of water. Shake out small portions of the solution thus formed with large amounts of ether; and separate the aqueous layers, and combine them. Then acidify the combined aqueous layer, as with hydrochloric acid, to about pH 1.5. The desired 3-hexadecyl-4-hydroxycoumarin crystallizes out during this acidification. The yield is about 7.6 g. (21%). After recrystallization from petroleum ether its melting point is 96–97° C.

Analysis: Calculated for $C_{25}H_{38}O_3$: C, 77.16; H, 10.14. Found: C, 77.35; H, 9.77.

Our overall reaction is as follows:

(12)

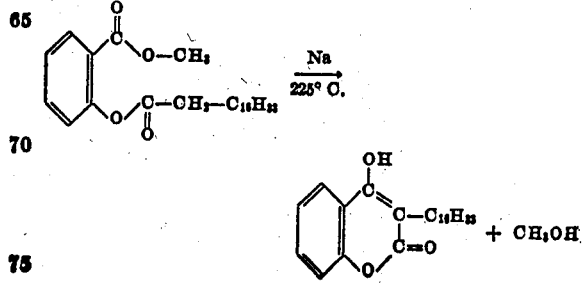

Example 13.—3-phenyl-4-hydroxycoumarin

A. Preparing α-toluylmethylsalicylate.—To prepare 3-phenyl-4-hydroxycoumarin, we use α-toluylmethylsalicylate (α-toluylsalicylic acid methyl ester) as a reactant. It may be prepared as follows: Reflux 470 g. of phenylacetic acid and 720 g. of thionyl chloride until evolution of hydrochloric acid gas ceases. Then fractionally distill the resultant product, and collect the fraction which boils at 103°–104° C. at 25 mm. pressure. This fraction is phenylacetyl chloride. The yield is about 487 g. (64%). To 382 g. of this phenylacetyl chloride add 382 g. of methylsalicylate; and heat the mixture at 180° C. until evolution of hydrochloric acid gas ceases. Then slowly add the product, with vigorous stirring, to 6 liters of cold water, which desirably contains a liberal amount of seed crystals from a previous run. Allow the mixture to stand about 3 hours, and then recover the solid matter by filtration, wash it with water, and recrystallize it from ethyl alcohol. It is the desired α-toluylmethylsalicylate, which melts at about 59°–60° C. The yield is about 428 g. (63%). Pauly & Lockemann (Berichte, vol. 48, p. 28 et seq.) reported the melting point of their phenylacetylsalicylic acid methyl ester as above 50° C.

B. Preparing 3-phenyl-4-hydroxycoumarin.—Heat 4.0 g. of sodium in 200 ml. of mineral oil to about 240° C., and then add about 45 g. of α-toluylmethylsalicylate while maintaining vigorous stirring. Maintain the temperature under reflux for 40 to 45 minutes after such addition is complete. Then decant the mineral oil from the viscous syrup which has formed; and wash that syrup with a low-boiling petroleum fraction, and dissolve it in about 600 ml. of water. Acidify the solution thus obtained to about pH 6.5, as with hydrochloric acid; and remove the oily precipitate formed on that acidification by shaking it out with ether. Separate the aqueous layer, and acidify it to pH 1.5, as with hydrochloric acid. The desired 3-phenyl-4-hydroxycoumarin crystallizes out during this acidification. The yield is about 10.0 g. (25%). When recrystallized from ethyl alcohol and water, the melting point is about 234°–235° C. Pauly & Lockemann (Berichte, vol. 48, p. 28 et seq.) report a melting point of 236° C. for the 3-phenyl-4-hydroxycoumarin prepared by them. The reaction by which it is formed is the same as that given in equation 4 above, save that it is carried out at a very considerably higher temperature and there are few if any side-reaction products contaminating the 3-phenyl-4-hydroxycoumarin.

Example 14.—3-benzyl-4-hydroxycoumarin

A. Preparing β-phenylpropionylmethylsalicylate.—To prepare 3-benzyl-4-hydroxycoumarin, we use β-phenylpropionylmethylsalicylate (β-phenylpropionyl salicylic acid methyl ester) as a reactant. It may be prepared as follows: Reflux 30 g. of hydrocinnamic acid and 48 g. of thionyl chloride for about 3 hours. Remove the excess thionyl chloride, as by reducing the pressure. To the remaining acid chloride add 30.4 g. of methyl salicylate, and reflux the mixture for about one hour. Then fractionally distill the dark viscous liquid which has resulted from that refluxing, and collect the fraction boiling at 197°–201° C. at 5 mm. pressure. It is the desired β-phenylpropionylmethylsalicylate. The yield is about 42 g. (74%).

$$D^{25}\ 1.1768 \quad N_D^{25}\ 1.5521$$

Analysis: Calculated for $C_{17}H_{16}O_4$: C, 71.83; H, 5.63 Found: C, 71.88; H, 5.60.

B. Preparing 3-benzyl-4-hydroxycoumarin.—Heat 2.3 g. of sodium in 100 ml. of mineral oil to about 235° C., and then add about 28.4 g. of β-phenylpropionylmethylsalicylate, while stirring vigorously. Maintain the 235° temperature, under reflux, for about half an hour after the addition is complete. Then decant the mineral oil from the gummy residue which has formed; and wash that gummy residue with a low-boiling petroleum fraction, and then stir it into and so far as possible dissolve it in about 600 ml. of water. Then add acid, conveniently hydrochloric or sulfuric acid, to produce about pH 7.0; extract with ether; and separate the aqueous phase. Acidify that aqueous phase to about pH 1.5. During that acidification the desired 3-benzyl-4-hydroxycoumarin crystallizes out. The yield is about 5.5 g. (22%). When recrystallized from 95% ethyl alcohol, its melting point is about 202–205° C. This is the same melting point reported by Heilbron and Hill (Jour. Chem. Soc. vol. II, p. 1705 (1927) for the 3-benzyl-4-hydroxycoumarin prepared by them from the acid chloride of acetylsalicylic acid and the diethylester of sodio-benzyl-malonic acid—a method wholly different from ours.

Our overall reaction is as follows:

(13)

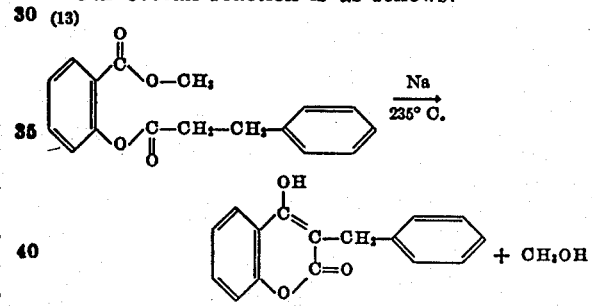

We have discovered that all these 4-hydroxycoumarins have anti-coagulant properties, on either oral or intravenous administration. Most of them, and most of the acylsalicylic acid esters from which they are made, are new with us.

We claim as our invention:

1. The process of purifying 4-hydroxycoumarins, which consists in forming a water solution of an alkali-metal salt of the impure 4-hydroxycoumarin, adding an acid to lower the pH to a value low enough to produce a precipitate containing impurities but high enough to avoid material precipitation of the 4-hydroxycoumarin, removing the precipitate so produced, and then adding more acid to lower the pH to a value low enough to precipitate the desired 4-hydroxycoumarin.

2. The process of purifying 4-hydroxycoumarin, which consists in forming a water solution of an alkali-metal salt of the impure 4-hydroxycoumarin, adding an acid to lower the pH to a value low enough to produce a precipitate containing impurities but high enough to avoid material precipitation of the 4-hydroxycoumarin, removing the precipitate so produced, and then adding more acid to lower the pH to a value low enough to precipitate 4-hydroxycoumarin.

3. The process of purifying 4-hydroxycoumarins as set forth in claim 1, in which the alkali metal is sodium.

4. The process of purifying 4-hydroxycoumarin as set forth in claim 2, in which the alkali metal is sodium.

5. The process of purifying 4-hydroxycoumarins as set forth in claim 1, in which the acid used is hydrochloric acid.

6. The process of purifying 4-hydroxycoumarin as set forth in claim 2, in which the acid used is hydrochloric acid.

MARK A. STAHMANN.
KARL PAUL LINK.

REFERENCES CITED

The following references are of record in the file of this patent:

UNITED STATES PATENTS

| Number | Name | Date |
|---|---|---|
| 1,888,713 | Britton | Nov. 22, 1932 |
| 2,349,765 | Shelton | May 23, 1944 |

FOREIGN PATENTS

| Number | Country | Date |
|---|---|---|
| 102,097 | Germany | Feb. 1899 |

OTHER REFERENCES

Chem. Abstracts, vol. IX, page 1052, citing: Berichte, vol. 48, pages 28–32 (1915).

McArdle, Solvents in Synthetic Organic Chem., VanNostrand, 1925, pages 1 to 3 and pages 114–116.

Organic Synthesis, Collective vol. I, Gilman J. Wiley, 1932, pages 233–4, 243–4.

Systematic Organic Chemistry, Cumming, Hopper & Wheeler, Constable, London, 1931, pages 95–98, 145–147.

Certificate of Correction

Patent No. 2,465,293.                                                               March 22, 1949.

MARK A. STAHMANN ET AL.

It is hereby certified that errors appear in the printed specification of the above numbered patent requiring correction as follows:

Column 1, line 51, for "vol. 269" read *vol. 259*; column 9, line 32, for that portion of the formula reading "$C_{43}$" read $C_{13}$; column 12, lines 11 to 17 inclusive, for that portion of the formula reading

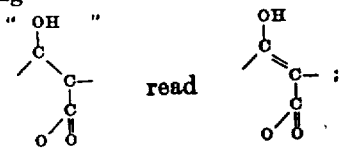

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*